United States Patent [19]
DesBlache et al.

[11] Patent Number: 4,672,669
[45] Date of Patent: Jun. 9, 1987

[54] VOICE ACTIVITY DETECTION PROCESS AND MEANS FOR IMPLEMENTING SAID PROCESS

[75] Inventors: Andre DesBlache, Nice; Claude Galand, Gagnes-sur-Mer; Robert Vermot-Gauchy, Saint Paul, all of France

[73] Assignee: International Business Machines Corp., Armonk, N.Y.

[21] Appl. No.: 616,021

[22] Filed: May 31, 1984

[30] Foreign Application Priority Data

Jun. 7, 1983 [EP] European Pat. Off. ........ 83430018.8

[51] Int. Cl.[4] .............................................. G10L 5/00
[52] U.S. Cl. ..................................................... 381/46
[58] Field of Search ........................ 381/46; 364/513.5

[56] References Cited

U.S. PATENT DOCUMENTS

4,351,983  9/1982  Crouse et al. ........................ 381/46

OTHER PUBLICATIONS

Comsat Technical Review, vol. 6, No. 1, Printemps 1976, pp. 127-158, Communications Satellite Corporation, Washington, D.C., S. J. Campanella: "Digital Speech Interpolation", p. 151, 1. 4, p. 153, 1. 23.

Comsat Technical Review, vol. 6, No. 1, Printemps 1976, pp. 159-178, Communications Satellite Corporation, Washington, D.C., J. A. Jankowski, Jr., "A New Digital Voice-Activated Switch".

IEEE Transactions on Communications, vol. COM-28, No. 3, Mar. 1980, pp. 334-344, IEEE, New York, R. V. Cox et al., "Multiple User Variable Rate Coding for TASI and Packet Transmission Systems", p. 334, 1. 9-11.

Alta Frequenza, vol. 43, No. 9 Sep. 1974, pp. 682-41-8E-689-425E, Milan, It, I. Poretti et al., "Use of Digital Speech Interpolation Equipment to Increase the Transmission Capacity of Telecommunication Systems", p. 683-419E, para. 3, p. 685-421E, 1. 21.

Primary Examiner—F. S. Matt Kemeny
Attorney, Agent, or Firm—John B. Frisone

[57] ABSTRACT

Speech signal presence is detected in a VAD (Voice Activity Detector) in two steps: (1) Signal energy above a threshold decides presence, below threshold decides ambiguity; (2) ambiguity is resolved by testing the rate of change of spectral parameters.

8 Claims, 9 Drawing Figures

VOICE ACTIVITY DETECTION PROCESS AND MEANS FOR IMPLEMENTING SAID PROCESS

BRIEF BACKGROUND OF THE INVENTION

1. Field of Invention

This invention deals with digital speech transmission and more particularly with means for efficiently processing speech signals to enable effective use of channel bandwidth.

2. Technical Background

In view of the high cost of transmission channels, it might be wise to take advantage of any speech characteristics which would enable concentrating the traffic of a maximum number of telephone users over a same channel.

During a telphone conversation, each subscriber speaks less than half the time during which the connection is established. The remaining idle time is devoted to listening, gaps between words and syllables, and pauses. A number of systems have already been proposed which take advantage of this idle time. For instance, additional users, up to twice the overall channel capacity, are assigned to a channel in TASI systems (see J. Campanella "Digital TASI", Comsat Technical Revue of 1975). These systems obviously need means for detecting user inactivity to be able to assign the channel to a different user. Unfortunately, the voice activity determination is far from being straightforward. In general, the method for detecting voice activity of a given speaker is based on measurement of the speech signal energy over short periods of time. The measured energy is then compared with a pre-specified threshold level. Speech is declared present if the measured energy exceeds the threshold, otherwise the period is declared idle, i.e. the concerned speaker is considered silent for said period of time. The problem lies with the threshold determination due to the fact that different speakers usually speak at different levels and also due to the fact that the losses vary from one transmission line to another. A threshold set too high would result in the clipping of speech signals. Thus, the received speech signal would be of rather poor quality. While a threshold set too low would obviously lead to degraded system efficiency, in addition, one has also to take into account the presence of noise which should be discriminated from voice signals.

An object of the present invention is to provide for an improved speech activity detection process.

Another object of the invention is to provide for means for detecting low level speech activity in the presence of high level background noise.

SUMMARY OF INVENTION

In a transmission system for transmitting voice signals each signal being sampled and coded to derive therefrom blocks of samples and short term power spectrum characteristics of each block, a voice activity detection process wherein energy representative information is derived from each block of samples, which energy representative information is compared with a predetermined threshold and said threshold is adjusted accordingly. Then an active/ambiguous decision is taken based on the relative magnitude of the energy information with respect to the adjusted threshold, which ambiguity, if any, is then resolved through analysis of the magnitude of variation of the short term power spectrum characteristics.

The foregoing and other features and advantages of this invention will be apparent from the following more particular description of the preferred embodiment of the invention as illustrated in the accompanying drawing.

DESCRIPTION OF A PREFERRED EMBODIMENT OF THE INVENTION

Figure 1:
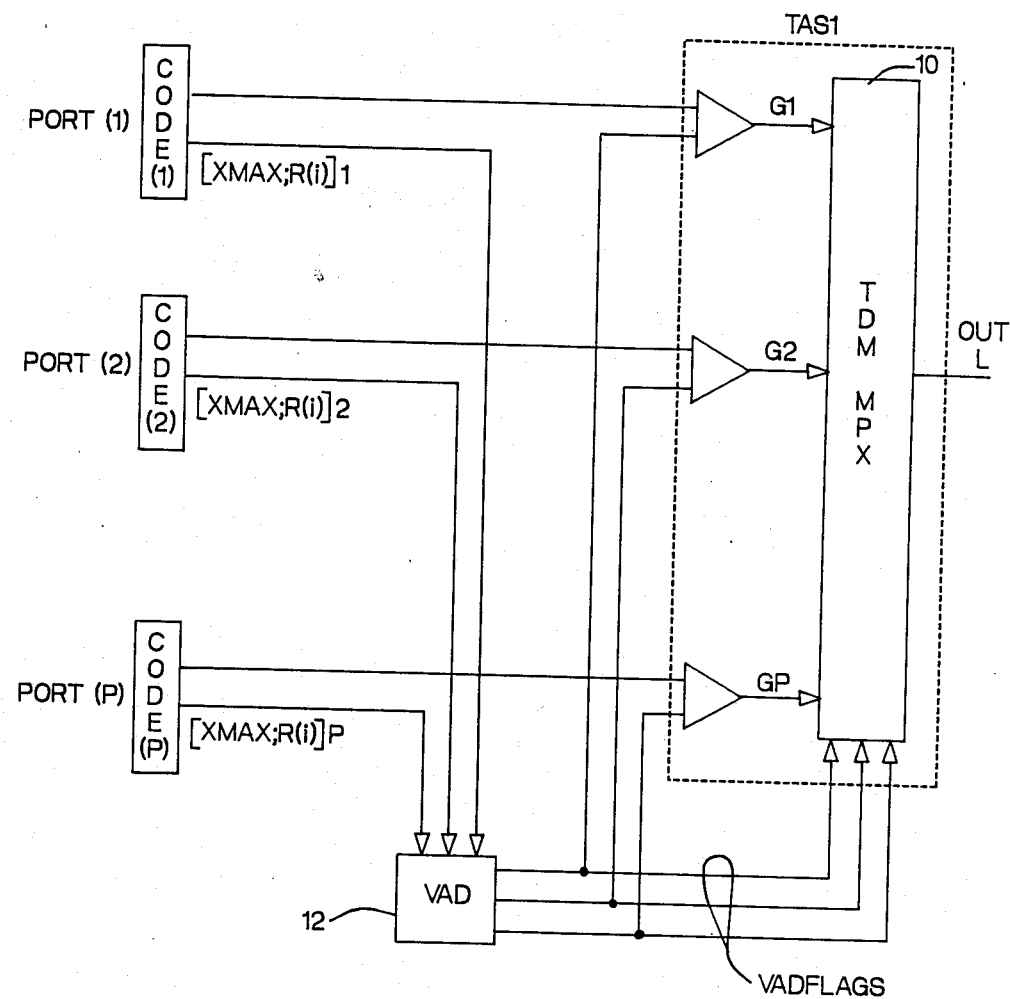
FIG. 1 is a block diagram of a TASI system.

Represented in FIG. 1 is a block diagram of a TASI type of system. P users, i.e. voice terminal sources, are respectively attached to individual input channels through coders (CODE 1, CODE 2,. . . , CODE P) attached to ports (PORT 1, PORT 2,. . . , PORT P). Each coder converts the analog voice signal fed by a user through a port into digital data. The digital data are then concentrated over a single output channel L to be forwarded to a remote receiving location (not shown) where it is redistributed to designated terminals (not shown) to which they are respectively assigned. The concentration operation is performed through a Time Division Multiplexer (TDM-MPX) 10. Under normal TDM conditions the number of users is selected such that the total number of bits per second provided by the P sources would match the output line transmission rate capability. But, as mentioned above, such an arrangement would not take full advantage of a number of speech characteristics, e. g. silences, as TASI systems do. For TASI operation, the number P of users attached to the system is purposely made higher than it would be in a conventional multiplex system. In other words, assuming all the users would be in operation at a given instant, then, the multiplexer and, more particularly the output line, would be unable to handle the resulting data traffic without taking into consideration the above mentioned silences or other inactivities. This is why, a Voice Activity Detector (VAD) 12 is connected to the output of each coder. Said VAD 12 continuously scans the coder outputs to detect those coders which may be considered active and gate their outputs into the multiplexer 10 through gates G1, G2,. . . , GP. The voice activity detector 12 also provides the multiplexer with the active coder address to be inserted within the multiplexed message and transmitted over the output line for each time frame. A voice terminal is considered active whenever its output level is above a threshold level preset within the Voice Activity Detector 12.

The voice activity detector, according to the invention, which not only enables adjusting its threshold to the speaker environmental conditions, but in addition takes full advantage of the coder characteristics. As already mentioned, voice activity detection is dependent on voice signal energy measurements. The proposed Voice Activity Detector VAD achieves cost effectiveness by using data already available within the coder for performing the energy measuring operation. It applies to a number of coders based on the linear prediction theory which assumes a modeling of the linear vocal tract by an all-pole filter. A detailed dissertation on this subject is provided by J. MARKEL and A. H. GRAY in their book on "Linear Prediction of Speech" published in 1976 by Springer Verlag, N. Y.

The modeling applies to a wide range of digital speech compression systems, e. g. adaptive predictive coders (APC), voice excited predictive coders (VEPC), linear prediction vocoders (LPC). For references on these coders one should refer to a number of publications including:

"Adaptive Predictive Coding of Speech Signals" by B. S. ATAL and M. R. SCHROEDER, in Bell Syst. Tech. Journal, Vol. 49, pp 1973-1986, Oct. 1970;

"9.6/7.2 Kbps Voice Excited Predictive Coder (VEPC)", by D. ESTEBAN, C. GALAND, D. MAUDUIT and J. MENEZ, in IEEE ICASSP, Tulsa, April 1978 wherein Kbps stands for Kilobits per second; and, "A Linear Prediction Vocoder Simulation Based on the Autocorrelation Method", by J. D. Markel and A. H. GRAY, in IEEE Trans. on Acoust., Speech and Signal Processing, Vol. ASSP-22, n° 2, pp 124-134, April 1974.

Figure 2:
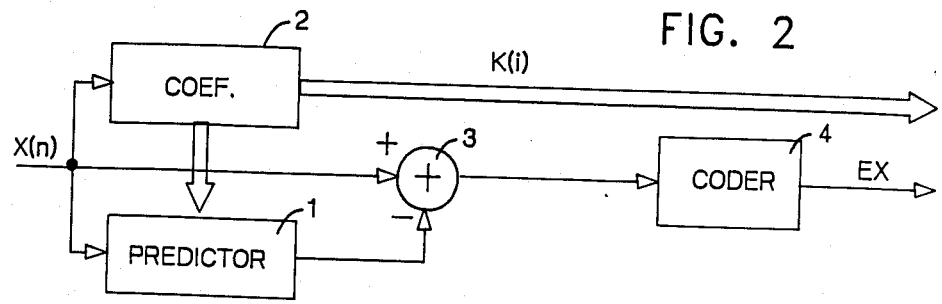
FIG. 2-4 are block diagrams of prior art coders based on linear prediction theory, FIG. 5 and 6 respectively summarize the linear prediction coders and decoders characteristics to be used for this invention, FIG. 7 and 8 summarize the various steps of the invention process.

In APC coders, the speech signal is inverse filtered by an optimum predictor, resulting in an excitation signal which is quantized, transmitted and used at the synthesis location to excite an all-pole filter. Both inverse and all-pole filter characteristics are derived from the voice signal characteristics. Shown in FIG. 2 is a block diagram summarizing the basic elements of an APC coder. The voice signal samples $x_{(n)}$ provided by blocks of N samples (see BCPCM or Block Companded POM techniques) are fed into a predictor filter 1, the coefficients K(i) of which are derived in 2 from the voice signal analysis. An excitation (residual) signal is then derived in 3, which residual signal is coded in 4 into an EX information. The voice signal is thus finally converted into K(i)s and EX/coded information.

Figure 3:
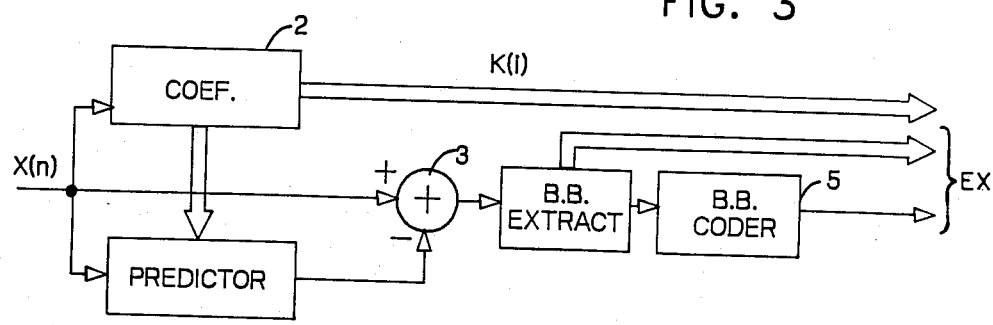

In VEPC coders, the excitation signal is approximated by considering only the lowest frequency band or Base Band BB (e.g.; 0-1 KHz) of the original excitation signal. A block diagram summarizing the VEPC coder functions is shown in FIG. 3. The difference over the APC coder lies in the fact that only the base-band is finally coded into SIGNAL in 5, while the upper band synthesis, e.g. 1-3 KHz is represented by its energy (ENERG).

The upper band components will be synthesized, when needed, (i.e. at the receiving station not shown) by means of non-linear distortion, high-pass filtering, and energy matching. Additional on VEPC coding is also available in U.S. Pat. No. 4,216,354, assigned to the same assignee as this application, said patent being herein incorporated by reference.

Figure 4:
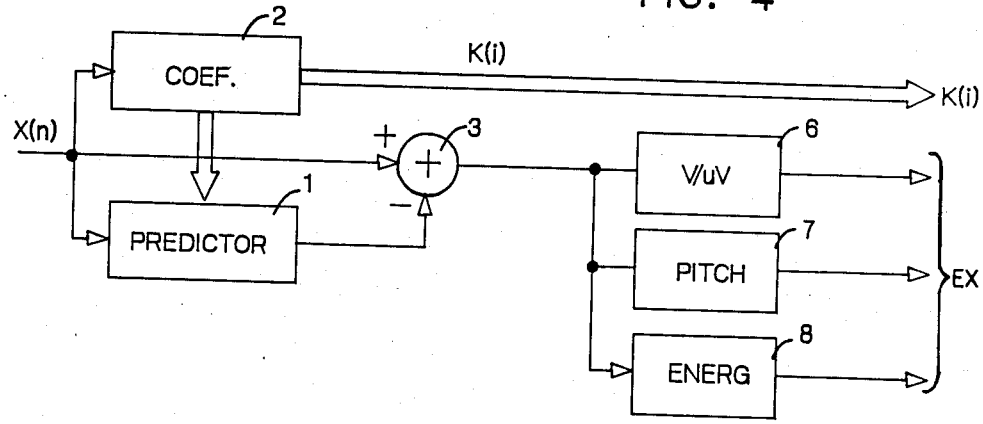

A block diagram for an LPC coder is represented in FIG. 4. In this case, the excitation signal is represented by a voiced/unvoiced (V/UV) (6) decision (1 bit), a pitch period representation coded in (7) (e.g. 5 bits) and an energy indication (e.g. 4 bits) coded in (8).

In LPC decoders, and for synthesis purposes not shown, the excitation will be approximated either by a pulse train at the pitch frequency in the case of voiced signals, or by white noise in the case of unvoiced signals.

Figure 5:
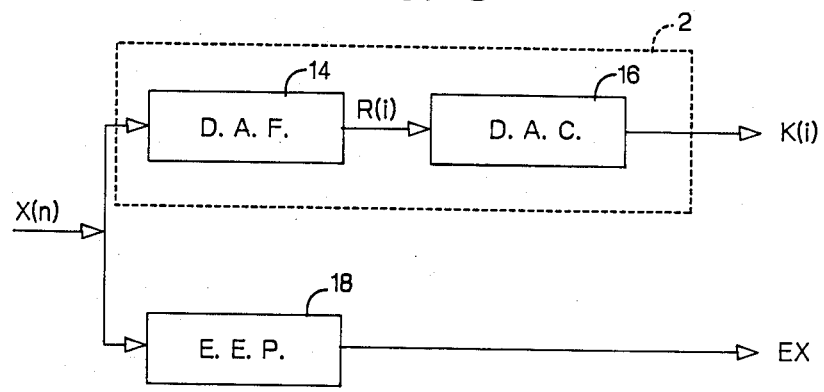

A common block diagram for the analysis part of the coders based on the three above cited techniques is shown in FIG. 5. The input speech signal is analysed by blocks of N samples $x_{(n)}$, based on the assumption that the signal is stationary within each block. The upper path of the analyser includes means for the determination of autocorrelation function (DAF), which means extracts spectral information R(i) based on autocorrelation coefficients from the input signal. This spectral information is then processed, in (DPC)16, for the determination of prediction coefficients K(i), which coefficients are to be transmitted to be used for synthesis purposes within the corresponding receiver. Both devices 14 and 16 are eventually included within the device 2 of FIGS. 2 through 4. In addition algorithms for converting R(i)s into K(i)s, and vice-versa, are well known in the art. In the lower portion of FIG. 5, extraction of excitation data EX is performed in (E.E.P.) 18. The excitation data contents differ from one type of coder to another. When using Adaptive Predictive Coding (APC) means, the EX parameters will include the encoded excitation signal. With Linear Prediction Vocoders (LPC) the EX parameters include: pitch period indication; voiced/unvoiced decision indication; and block energy indication. While, with Voice Excited Predictive Vocoders (VEPC) the EX parameters include: encoded base-band signal and high-frequency energy indication, respectively designated by SIGNAL and ENERG in the above cited patent.

Figure 6:
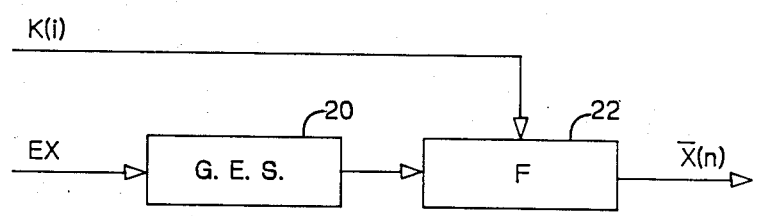

A common block diagram of the synthesizing means for the three above techniques, i.e. APC, LPC and VEPC, is shown in FIG. 6. The received EX parameters are used for generating the excitation signal (GES) in 20. Said excitation signal is used to excite a model digital filter (F) 22 whose coefficients are adjusted by the received prediction coefficients K(i). Reconstructed voice samples $\bar{x}_{(n)}$ are provided by filter 22.

The above mentioned coders may be used to achieve compression of a speech signal originally coded at 64 Kbps (CCITT PCM) into 2.4 to 32 Kbps. The resulting quality would range from synthetic quality (2.4 Kbps) to communications quality (16 Kbps) and toll quality (32 Kbps). For a full understanding the above comments one can refer to "Speech Coding" published by J. L. FLANAGAN, M. R. SCHROEDER, B. S. ATAL, R. E. CROCHIERE, N. S. JAYANT and J. M. TRIBOLET in IEEE Trans. on Communications, Vol. COM-27, N° 4, pp 710-737, April 1979. Such compression already enables a use of the communication channel. The use of TASI techniques, in addition thereto, roughly doubles this efficiency at no substantial added cost, which is particularly true with this improved voice activity detection method.

The activity decision at the output of each voice coder CODE 1,..., CODE P (see FIG. 1) is naturally based on an evaluation, for each block of N input speech samples, of the signal energy, and on the comparison of this energy with an activity threshold.

The characteristics of possibly existing background noise in any normal environment will also be taken into account by continuously evaluating the power spectrum of said noise.

In addition, the proposed process will keep significantly low the processing workload required once associated with a speech coder based on linear prediction.

Indeed, the short term power spectrum of the signal in a block of samples is directly related to the autocorrelation function of this signal, and the energy of the signal is well approximated by the magnitude of the largest sample within the block. This information is available within the coder. One is used for the computation of the predictor coefficients, the other for intermediate signal scaling in a fixed point implementation. For instance, in coders operating according to Block Companding PCM techniques, the block characteristic term (C) or scaling factor already available is directly related to the magnitude of the largest sample within the block. In other words, given a block of N samples $x_{(n)}$ with $n = 1, 2, \ldots, N$, the magnitude XMAX of the largest sample is normally determined within the coder independently of any voice activity detection requirement.

$$C = XMAX = MAX\,(|x_{(n)}|)$$

In practice, the C coefficient is used for normalizing the input signal prior to performing autocorrelation, coefficients determination, and thus "C" is already available within the coder, apart from any voice activity determination concern.

For the duration of each block of samples (e. g. 20 ms), and based on each XMAX value measured, the Voice Activity Detection (VAD) operations will be performed on the following principles. If XMAX is smaller than a predetermined threshold level, then the threshold should be adjusted to XMAX rapidly; otherwise, the threshold adjustment will be made progressively from one block of signal samples to the following blocks. This threshold adjustment helps tracking background noises with increasing energy levels.

The second principle is based on a measurement of XMAX with respect to the current threshold value. If XMAX is substantially larger than the threshold level, ( XMAX > k. (threshold value), with k > 1), the block of samples being processed is considered as deriving from voice signal, i. e. the corresponding channel, is considered "active". Otherwise, an ambiguity still remains which should be resolved.

It should be understood that instead of XMAX one might consider any block energy representative information XM.

The ambiguity resolution is based on two assumptions. First, if the time delay between the block of samples being presently processed and the last "active" block provided by the considered channel is less than a given hangover delay, then the block is classified as being an "active" block (i. e. provided by an active channel). Otherwise, the system would rely on an additional test based on spectral analysis of the signal. In other words, the system would then rely on the short-term power spectrum of the signal in a block of samples which is directly related to the function (R(i)) of this signal. Assuming the R(i) function variation is significantly large, then the block is considered "active", otherwise the block is considered "inactive" i. e. equivalent to silence.

The hangover delay consideration will help in bridging short intersyllabic silences (0.1 to 1 second for instance) while it does not increase significantly the speech activity (less than 5%). This hangover enables avoiding the possible intersyllabic clipping which is unpleasant.

The threshold adjustment combined with spectral variations analysis enables rejecting large steady background noise. For example, assuming the speaker operates in a white noise environment, if a blower is turned on, thus producing a high acoustic energy, the Voice Activity detector will adapt itself and detect low energy voice segments such as fricatives in utterance attacks, and reject non speech segments.

Figure 7:
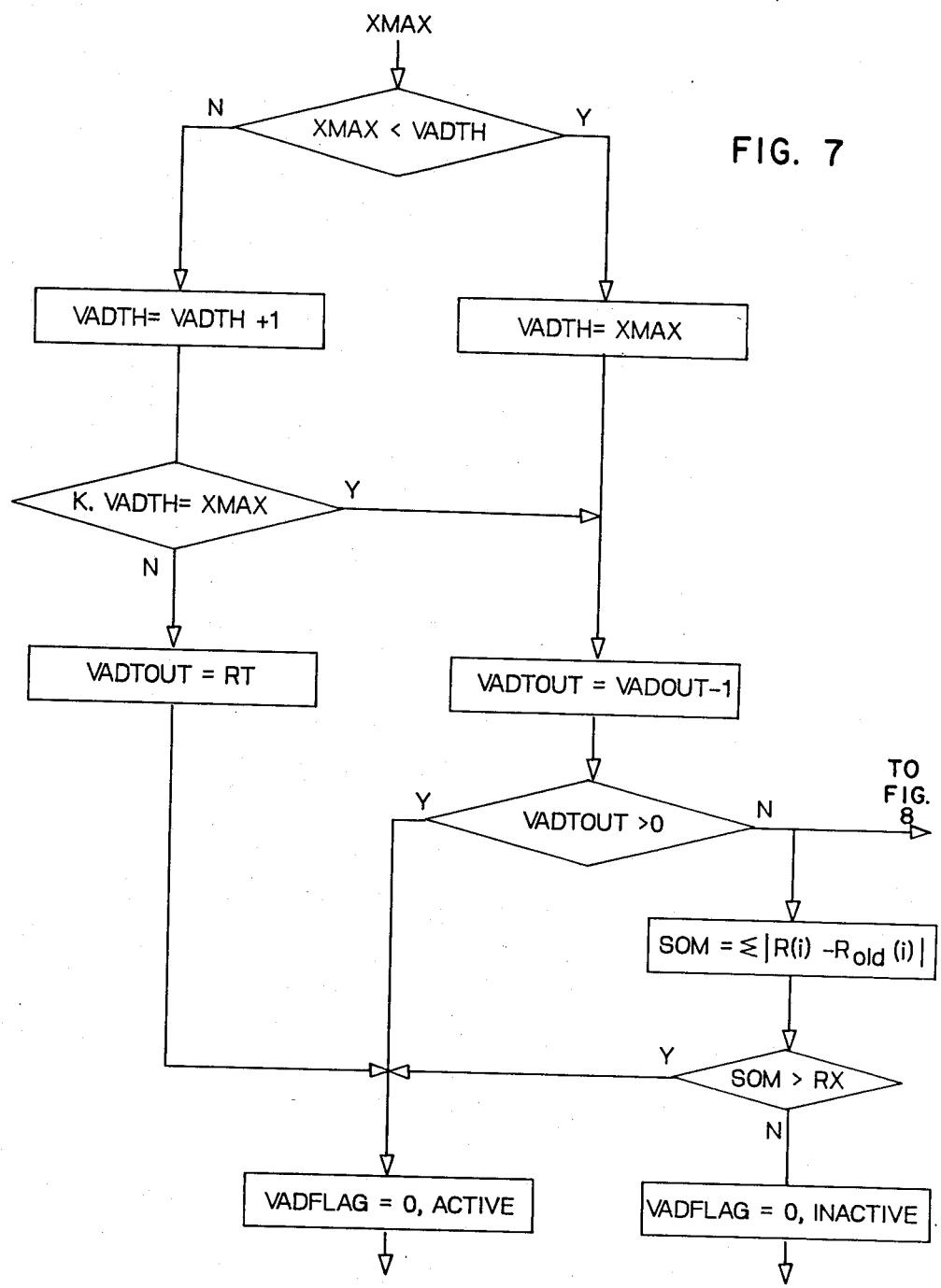
Figure 8:
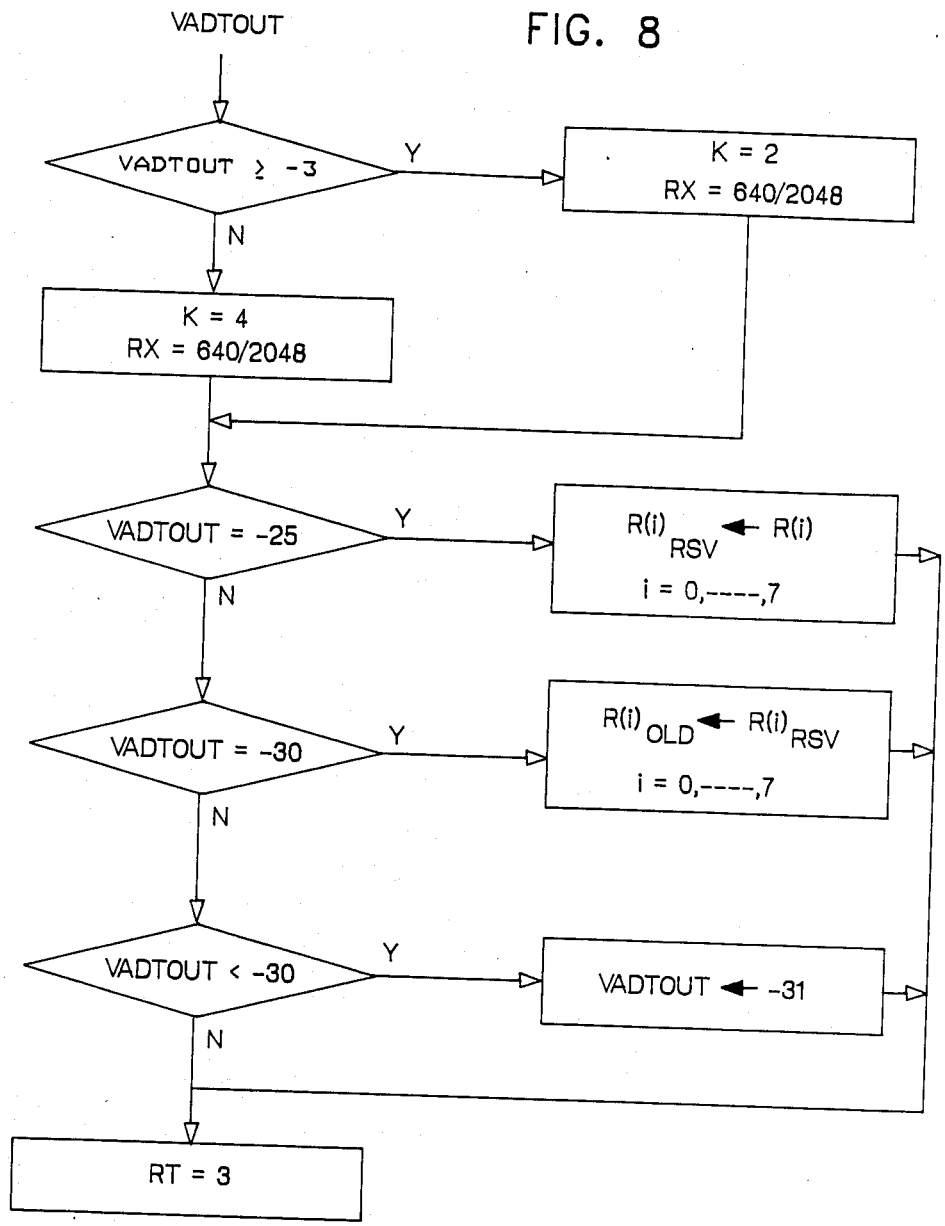

FIGS. 7 and 8 summarize the various steps of the Voice Activity detection method according to which each block of samples is processed. The current autocorrelation coefficients R(i) as well as XMAX are previously stored. XMAX is first compared with a predetermined threshold level VADTH initially set empirically. The level of said threshold is then dynamically adjusted based on this XMAX versus VADTH test. If XMAX is smaller than VADTH then the threshold is rapidly updated to XMAX value. Otherwise, XMAX is updated by a small increment by setting the new VADTH to VADTH+1, with the decimal value of said "1" increment being equal to $\frac{1}{2}^{11}$ or 1/2048.

The next test determines whether XMAX is substantially greater than VADTH. For that purpose, XMAX is compared with k.VADTH, with k=2 or 4 as indicated in connection with FIG. 8. If this is the case, i.e. XMAX > k.VADTH, then the block is said to be active, i. e. to be a speech signal and a flag (VADFLAG) is set to one. Simultaneously, a hangover decounter, i. e. timer VADTOUT is set to RT a predetermined time delay value, say 3 to 50 block lengths durations (20 ms each). If XMAX is not substantially greater than VADTH, then an ambiguity persists. The block might be active or inactive. The hangover counter is decreased by one unit for the currently processed block. As long as the counter contents is positive, then the block is classified as an active block.

Now, assuming the hangover time has elapsed, then the short term power spectrum function variation is computed by measuring $$SOM = \sum_{i=1}^{7} |R(i) - R_{old}(i)|$$

wherein $\Sigma$ symbolizes a summing operation, and $|\;|$ indicates that magnitude is considered. If SOM is greater than a predetermined value RX empirically set to, say, the decimal value 1280/2048 or to 640/2048, then again, the block is considered active. Otherwise, the block is classified "non active" or corresponding to a speaker's silence. The VADFLAG is then set to zero.

The short term power spectrum information may also be derived differently, e.g. using prediction coefficients K(i) rather than R(i)'s.

While FIG. 7 summarizes the main steps of the Voice Activity Detection process, the short term power spectrum information computing process and the various parameters updatings are more particularly addressed by FIG. 8. According to this figure, several tests are performed. The first test (VADTOUT $\geq$ −3?) enables setting k to 2 or 4 and RX decimal value to 0.3 or 0.6.

The second test is intended to decide when a snap shot should be taken of the autocorrelation function which will later on be used to update the $R(i)_{old}$ terms. For instance, the updating operation may be performed at the 25$^{th}$ inactive (silence) block, in other words after 25 consecutive detections of inactive blocks. But the effective $R(i)_{old}$ updating operation is delayed by 5 additional consecutive ambiguous blocks. Also, assuming more ambiguous block are detected subsequently, the VADTOUT is arbitrarily set to a fixed value to avoid any counter overflow.

Figure 9:
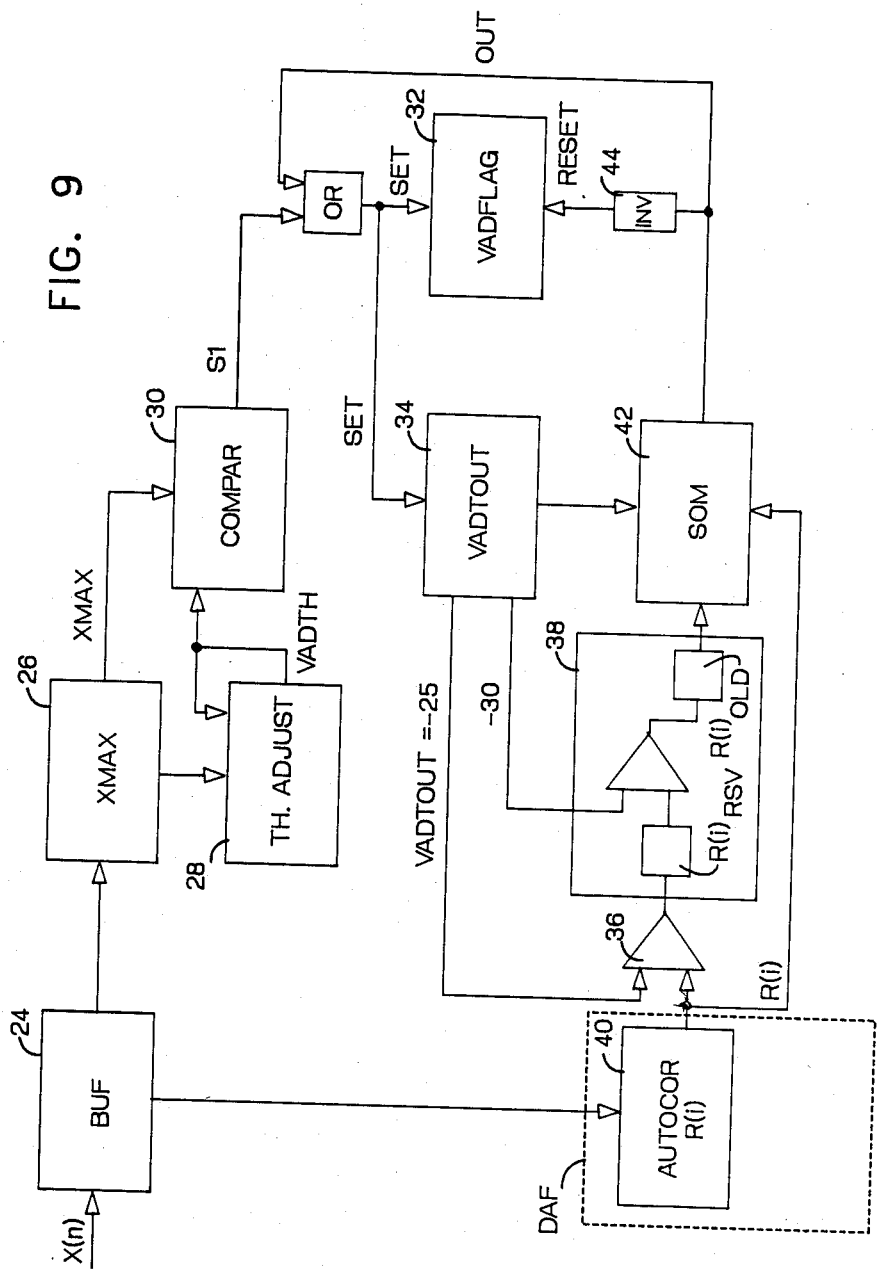
FIG. 9 is a block diagram of a device for implementing the invention.

A block diagram of a system for implementing the Voice Activity Detection process is shown in FIG. 9.

An input buffer (BUF) 24 stores blocks of samples $x_{(n)}$. Assuming the input signal is sampled at 8 KHz, and assuming each block of samples represents a segment of signal 20 ms long, then each block contains 160 samples. These samples are sorted in 26 to derive, for each block of samples, the XMAX information therefrom. With a fixed point implementation, the XMAX determination is already performed within the coder to scale the samples, and need not be repeated for the Voice Activity Detection (VAD) purposes.

XMAX is then moved into a threshold adjusting device (TH. ADJUST) 28 where it is first compared with a previously set threshold VADTH. Based on said compare result, VADTH is adjusted by either being slightly incremented or by being forced to XMAX value.

The XMAX−k.VADTH>0 k=2 or 4 for example, test is then performed in (COMPAR.) 30.

A bit Sl is set to one in case the above test result is negative. Sl is used to set a VADFLAG latch 32 and set the timer VADTOUT 34 to say, 3 units (i.e. 60 ms). Whenever Sl=0, then the VADTOUT timer is decremented by one unit (i.e. 20 ms).

The timer 34 provides a gating bit whenever the timer contents is equal to −25. This bit is used to open a gate 36 to update the contents of an autocorrelation memory 38 contents. The normalized autocorrelation coefficients R(i)/R(0) to be moved into memory 38 are provided by a device 40 which is part of the autocorrelation function determinator (DAF) 14. This updating is done through a buffer $R(i)_{RSV}$, and is confirmed when the counter VADTOUT is equal to −30. The R(i) coefficients need not be computed for the Voice Activity detection operation since they have already been computed within the coder, for each block of samples.

Whenever the VADTOUT timer equals zero, the R(i) function variation computation is started in SOM device 42. Said device 42 being connected to devices 38 and 40 computes $$SOM = \sum_{i=1}^{7} \left| \frac{R(i)}{R(0)} - \frac{R_{old}(i)}{R_{old}(0)} \right|$$

and thus determines the magnitude of variation of the short term power spectrum characteristics.

The device 42 also compares SOM to a short term power spectrum variation reference value RT. A positive test SOM>RT sets a bit S2 to logic level 1 (active channel). This logic level is used to set the VADFLAG to 1. The VADFLAG=1 indication is also forwarded to the multiplexer 10 (FIG. 1) together wherein its PORT origin is identified.

Otherwise S2=0 and said S2 bit is inverted in 44 and used to reset VADFLAG to zero; in which case the channel is considered inactive or idle.

What is claimed is:

1. In a system wherein at least one voice signal provided by a source via an input channel is coded to derive therefrom blocks of samples $x_{(n)}$ of predetermined duration, and, short term power spectrum information, a voice activity detection process for discriminating active voice blocks from non active voice blocks said process including, for each block of samples the following steps:

(a) Setting an amplitude threshold VADTH;
    (b) Processing the block of $x_{(n)}$ values to derive therefrom a signal energy representative information XM ;
    (c) First comparing XM to VADTH and adjusting said threshold accordingly;
    (d) Second comparing XM to k. VADTH, where k is a predetermined numerical value and VADTH is the adjusted threshold, to derive therefrom a channel activity indication when XM is larger than k. VADTH, or an ambiguity indication otherwise, whereby a hangover timer is set upon activity detection or ambiguity resolution operations are to be performed upon ambiguity detection, which ambiguity resolution includes:
    decreasing and testing said timer contents whereby a positive timer contents is indicative of an active voice block and a negative timer contents is still indicative of an ambiguity situation;
    computing short term power spectrum information variation between the currently processed block and at least one previously processed block ; and,
    comparing said short term power spectrum variation with a preset reference level, whereby the currently processed ambiguous block is considered inactive or active based on said comparison indication.

2. In a system according to claim 1 wherein said threshold adjustment step is performed by either forcing the VADTH value to XM or by progressively adjusting said threshold from one block to the next, depending upon the first XM to VADTH compare result.

3. In a system according to claim 2 wherein k=2 or 4 according to said counter contents.

4. In a system according to claim 3 wherein said timer is set for a maximum value equal to three to fifty blocks durations, and to be decrementable by increments equal to a block duration.

5. In a system according to claim 4 wherein said short term power spectrum information is provided by the set of autocorrelation coefficients R(i) derived from the processed block of samples.

6. In a system according to claim 5 wherein said voice signal is coded according to the so-called linear prediction theory.

7. In a system according to claim 6 wherein said signal energy representative information is approximated by the amplitude XMAX of the largest sample within the block.

8. In a system according to anyone of claims 1 through 7 wherein said preset reference level is adjusted to a first or a second predetermined value based upon said hangover time contents.

* * * * *